US008883945B2

(12) United States Patent
McNamee et al.

(10) Patent No.: US 8,883,945 B2
(45) Date of Patent: Nov. 11, 2014

(54) SURFACTANT

(75) Inventors: William Harry McNamee, Claymont, DE (US); Trevor Graham Blease, Stockton on Tees (GB); Johnny Denis Grade, Meldert (BE); Hanamanthsa Shankarsa Bevinakatti, Ingleby Barwick (GB)

(73) Assignees: Croda International PLC, Goole, East Yorkshire (GB); Croda Americas LLC, Wilmington, DE (US)

( * ) Notice: Subject to any disclaimer, the term of this patent is extended or adjusted under 35 U.S.C. 154(b) by 897 days.

(21) Appl. No.: 10/583,085

(22) PCT Filed: Dec. 15, 2004

(86) PCT No.: PCT/GB2004/005240
§ 371 (c)(1),
(2), (4) Date: Aug. 17, 2007

(87) PCT Pub. No.: WO2005/059042
PCT Pub. Date: Jun. 30, 2005

(65) Prior Publication Data
US 2007/0299228 A1 Dec. 27, 2007

(30) Foreign Application Priority Data
Dec. 17, 2003 (GB) .................................. 0329178.8

(51) Int. Cl.
| C09D 5/02 | (2006.01) |
| B01F 17/00 | (2006.01) |
| C09D 167/00 | (2006.01) |
| C09D 167/08 | (2006.01) |
| C08G 65/26 | (2006.01) |
| C08G 65/329 | (2006.01) |
| C08L 67/08 | (2006.01) |
| C08K 3/00 | (2006.01) |
| C08K 5/41 | (2006.01) |
| C08K 5/00 | (2006.01) |
| C08K 5/42 | (2006.01) |
| C08K 5/09 | (2006.01) |
| C08K 5/521 | (2006.01) |

(52) U.S. Cl.
CPC ........... *B01F 17/005* (2013.01); *B01F 17/0042* (2013.01); *C08G 65/26* (2013.01); *C08K 3/0033* (2013.01); *B01F 17/0021* (2013.01); C08K 5/41 (2013.01); C08K 5/0041 (2013.01); C08K 5/42 (2013.01); C08L 2201/50 (2013.01); *B01F 17/0028* (2013.01); C08K 5/09 (2013.01); *C08G 65/329* (2013.01); *C08K 5/521* (2013.01); *C09D 167/08* (2013.01); C08L 2201/52 (2013.01); *C08L 67/08* (2013.01); Y10S 526/932 (2013.01)
USPC ...... 526/238.23; 526/296; 526/312; 526/335; 526/932; 524/24; 562/592; 562/590; 564/123; 564/133; 564/138; 564/164

(58) Field of Classification Search
CPC ...... C09D 5/02; C09D 167/00; C09D 167/08; B01F 17/00
USPC .............. 524/801, 77, 376, 24; 562/592, 590; 526/932; 564/123, 133, 138, 164
See application file for complete search history.

(56) References Cited

U.S. PATENT DOCUMENTS

| 3,172,750 | A | 3/1965 | Altscher et al. |
| 3,954,658 | A | 5/1976 | Tsutsumi et al. |
| 4,687,843 | A | 8/1987 | Smolin et al. |
| 5,609,722 | A | 3/1997 | Rodriguez et al. |
| 6,613,817 | B2 * | 9/2003 | Bouvy et al. ................... 523/503 |
| 6,780,910 | B2 * | 8/2004 | Bouvy et al. ................... 524/376 |
| 2003/0153787 | A1 * | 8/2003 | Carpenter et al. ............ 562/592 |
| 2003/0187103 | A1 * | 10/2003 | Bloom et al. ................... 524/35 |

FOREIGN PATENT DOCUMENTS

| EP | 0325054 | 7/1989 |
| GB | 786543 | 11/1957 |
| GB | 1545031 | 5/1979 |
| JP | 8165158 | 6/1996 |
| WO | 03/060023 | 7/2003 |

OTHER PUBLICATIONS

Lewis, Richard J., Sr. (2002). Hawley's Condensed Chemical Dictionary (14$^{th}$ Ed.), Online version available at http://www.knovel.com/web/portal/browse/display?*

* cited by examiner

Primary Examiner — James J Seidleck
Assistant Examiner — Deve E Valdez
(74) Attorney, Agent, or Firm — Jones Day

(57) ABSTRACT

A compound of the formula $R^1 \cdot [(AO)_n - R^2]_m$ (I) where: $R^1$ is the residue of a group having at least m active hydrogen atoms; AO is an alkylene oxide residue; each n is independently from 1 to 100; m is at least 2; and each $R^2$ is independently H, a $C_1$ to $C_{21}$ hydrocarbyl, or an acyl group $-OC \cdot R^3$, where $R^3$ is a $C_1$ to $C_{21}$ hydrocarbyl group, wherein on average greater than one of the $R^2$ groups is or comprises a $C_4$ to $C_{21}$ hydrocarbyl group comprising at least two ethylenic double bonds. The compounds are particularly suitable for use in preparing aqueous emulsions or dispersions of resins and polymers, especially alkyd resins.

23 Claims, No Drawings

SURFACTANT

CROSS REFERENCE TO RELATED APPLICATION

This application is the National Phase application of International Application No. PCT/GB2004/005240, filed Dec. 15, 2004, which designates the United States and was published in English. This application, in its entirety, is incorporated herein by reference.

FIELD OF INVENTION

This invention relates to ethylenically unsaturated surfactants, and in particular to the use thereof to prepare aqueous emulsions and/or dispersions of resins and/or polymers, especially alkyd resins.

BACKGROUND

Curable alkyd resins, often referred to as "air drying" alkyds, are widely used in industry in surface coatings such as paints, in particular decorative paints. They are well known materials, and generally they are film forming polyesters including residues of polybasic, usually di-basic, acid(s) and polyhydroxy, usually tri- or higher hydroxy alcohols and further including monobasic unsaturated (often multiple unsaturated) fatty acid residues. Such alkyd resins may include other residues and/or additives to provide specific functionality for the intended end use, e.g. sources of additional carboxyl groups may be included to improve resin emulsifyability. Curable alkyds are widely included in paints, which may be solvent based, water based or use mixed solvent/water vehicles, in which the alkyd is in the dispersed phase. The alkyds are usually formed into an emulsion before incorporation into the paint and in such emulsions the alkyd is typically dispersed in the water phase as uniformly and generally as finely as is possible, and commonly surfactants, particularly emulsifiers, are used to aid this.

Emulsifiers can contribute to fine and uniform alkyd resin droplets in emulsions. Typical emulsifiers are relatively low molecular weight surfactant materials, which in emulsions tend to be concentrated at or near the resin/water interface. However, during drying of resin films made from emulsions, the emulsifiers tend to migrate to and accumulate either near the air/film or near the substrate/film interfaces and can have adverse effects on film water sensitivity, gloss retention, reduced adhesion on substrate, film haze, and on film hardness. Some of these effects can be mitigated by using reactive emulsifiers. For example, WO 92/09667 A describes the use of fatty acid alkoxylates of the general formula: R—CO—NH—$(C_mH_{2m})$—O-$(AO)_n$—H, where R is $C_7$ to $C_{23}$ polyunsaturated alkyl, m is 2-4, AO is an alkylene oxide residue, and n is 2-30, which are described as participating in the curing of the binder, thus reducing some of the adverse effects of surfactants. However, there is still a need to further improve film properties.

The present invention is based on our finding that certain types of ethylenically unsaturated surfactants are effective emulsifiers for resins, preferably alkyd resins, and particularly unsaturated curable alkyd resins. The use of the surfactants can result in well cured films without deactivating typical alkyd drying catalysts, giving films of high hardness and good water resistance, whilst maintaining good gloss.

SUMMARY OF THE INVENTION

We have now surprisingly discovered an improved surfactant, which overcomes or significantly reduces at least one of the aforementioned problems.

The invention accordingly provides a compound of the formula (I):

$$R^1.[(AO)_n.R^2]_m \quad (I)$$

where:
 $R^1$ is the residue of a group having at least m active hydrogen atoms;
 AO is an alkylene oxide residue;
 each n is independently from 1 to 100;
 m is at least 2; and
 each $R^2$ is independently H, a $C_1$ to $C_{21}$ hydrocarbyl, or an acyl group —OC.$R^3$ where $R^3$ is a $C_1$ to $C_{21}$ hydrocarbyl group, wherein on average greater than one of the $R^2$ groups is or comprises a $C_4$ to $C_{21}$ hydrocarbyl group comprising at least two ethylenic double bonds.

The present invention also provides a method of forming a compound of formula (1) as defined herein which comprises reacting a fatty acid or derivative thereof having an iodine value in the range from 100 to 250 g/100 g with an alkoxylated $R^1$ group.

The invention further provides an aqueous emulsion or dispersion of polymeric particles comprising a compound of formula (1) as defined herein.

The invention still further provides a method of making an aqueous emulsion of an alkyd resin which comprises forming a mixture of the resin and surfactant, including at least one compound of formula (I) as defined herein, including water in the mixture to form a water-in-oil (resin) emulsion, and subsequently adding water to the water-in-oil emulsion at least until the emulsion inverts to form an oil (resin)-in-water emulsion and, optionally, adding further water to adjust the disperse phase content of the emulsion to that desired.

The invention yet further provides a paint which comprises:
(1) an aqueous or mixed aqueous organic continuous phase;
(2) an alkyd resin emulsion discontinuous phase;
(3) at least one compound of formula (I) as defined herein as an emulsifier; and
(4) at least one pigment.

The compounds of the present invention are at least notionally built up from the group $R^1$ that can be considered as the "core group" of the compounds. This core group is the residue (after removal of m active hydrogen atoms) of a compound containing at least m active hydrogen atoms, preferably present in hydroxyl and/or amino groups, and more preferably present in hydroxyl groups only. Preferably the core group is the residue of a substituted hydrocarbyl group, particularly a $C_3$ to $C_{30}$ substituted hydrocarbyl compound.

Examples of $R^1$ core groups include the residues of the following compounds after removal of m active hydrogen atoms:

1 glycerol and the polyglycerols, especially diglycerol and triglycerol, the partial esters thereof, or any triglycerides containing multiple hydroxyl groups, for example castor oil;

2 tri- and higher polymethylol alkanes such as trimethylol ethane, trimethylol propane and pentaerythritol, and the partial esters thereof;

3 sugars, particularly non-reducing sugars such as sorbitol, mannitol, and lactitol, etherified derivatives of sugars such as sorbitan (the cyclic dehydro-ethers of sorbitol), partial alkyl acetals of sugars such as methyl glucose and alkyl (poly-) saccharides, and other oligo-/poly-mers of sugars such as dextrins, partially esterified derivatives of sugars, such as fatty acid esters, for example of lauric, palmitic, oleic, stearic and behenic acid, esters of sorbitan, sorbitol, and sucrose, aminosaccharides such as N-alkylglucamines and their respective N-alkyl-N-alkenoyl glucamides;

4 polyhydroxy carboxylic acids especially citric and tartaric acids;
5 amines including di- and poly-functional amines, particularly alkylamines including alkyl diamines such as ethylene diamine (1,2-diaminoethane);
6 amino-alcohols, particularly the ethanolamines, 2-aminoethanol, di-ethanolamine and triethanolamine;
7 carboxylic acid amides such as urea, malonamide and succinamide; and
8 amido carboxylic acids such as succinamic acid.

Preferred $R^1$ core groups are residues of groups having at least three, more preferably in the range from 4 to 10, particularly 5 to 8, and especially 6 free hydroxyl and/or amino groups. The $R^1$ group preferably has a linear $C_4$ to $C_7$, more preferably $C_6$ chain. The hydroxyl or amino groups are preferably directly bonded to the chain carbon atoms. Hydroxyl groups are preferred. $R^1$ is preferably the residue of an open chain tetratol, pentitol, hexitol or heptitol group or an anhydro e.g. cycloether anhydro, derivative of such a group. In a particularly preferred embodiment, $R^1$ is the residue of, or a residue derived from, a sugar, more preferably a monosaccharide such as glucose, fructose or sorbitol, a disaccharide such as maltose, palitose, lactitol or lactose or a higher oligosaccharide. $R^1$ is preferably the residue of a monosaccharide, more preferably of glucose, fructose or sorbitol, and particularly of sorbitol.

The open chain form of $R^1$ groups is preferred, however groups including internal cyclic ether functionality can be used, and may be obtained inadvertently if the synthetic route exposes the group to relatively high temperatures or other conditions, which promote such cyclisation.

The index m is a measure of the functionality of the $R^1$ core group and generally the alkoxylation reactions will replace all active hydrogen atoms in the molecule from which the core group is derived. However, reaction at a particular site may be restricted or prevented by steric hindrance or suitable protection. The terminating hydroxyl groups of the polyalkylene oxide chains in the resulting compounds are then available for reaction, for example, with acyl compounds to form ester linkages. The index m will preferably be at least 3, more preferably in the range from 4 to 10, particularly 5 to 8, and especially 5 to 6. Mixtures may be, and normally are, employed, and therefore m can be an average value and may be non-integral.

The groups $R^2$ are the "terminating groups" of the (poly) alkylene oxide chains. The terminating groups may be hydrogen atoms, hydrocarbyl, or acyl groups. The terminating groups are preferably hydrogen atoms or acyl groups, and more preferably compounds according to the present invention comprise at least 2, more preferably in the range from 3 to 10, more preferably 4 to 8, particularly 4 to 6, and especially 4.5 to 5.5 acyl groups. Mixtures may be, and normally are, employed, and therefore the number of acyl groups can be an average value and may be non-integral.

In a suitable embodiment of the invention, on average at least 1.2, preferably in the range from 1.5 to 8, more preferably 2 to 6, particularly 2.5 to 5, and particularly 3 to 4 of the $R^2$ groups are or comprise a $C_4$ to $C_{21}$, preferably a $C_9$ to $C_{21}$, more preferably a $C_{15}$ to $C_{19}$, particularly $C_{17}$ to $C_{19}$, and especially a $C_{17}$ hydrocarbyl group comprising at least two ethylenic double bonds. The $R^2$ groups are preferably —OC.$R^3$ acyl groups wherein $R^3$ is a $C_4$ to $C_{21}$, preferably a $C_9$ to $C_{21}$, more preferably a $C_{15}$ to $C_{19}$, particularly $C_{17}$ to $C_{19}$, and especially a $C_{17}$ hydrocarbyl group comprising at least two ethylenic double bonds.

The aforementioned hydrocarbyl group comprising at least two ethylenic double bonds preferably comprises two and/or three double bonds. The hydrocarbyl group containing two double bonds is preferably derived from linoleic acid. The two double bonds preferably form an alkadienyl group. The hydrocarbyl group containing three double bonds is preferably derived from linolenic acid. Mixtures, for example derived from naturally occurring fats or oils, may be, and normally are, employed, and therefore the average number of double bonds may be non-integral, but preferably the number of double bonds present in hydrocarbyl groups comprising at least two double bonds is in the range from 2.0 to 3.0, more preferably 2.0 to 2.8, particularly 2.0 to 2.4, and especially 2.0 to 2.1.

In naturally occurring unsaturated fatty acids the double bonds are usually (internal) cis-double bonds, e.g. in linoleic acid the double bonds are both cis within a group —CH=CH—CH$_2$—CH=CH— in the chain. The double bonds in linoleic acid are not conjugated, although the double bonds in such materials can migrate to become conjugated and/or can change from cis to trans, especially in the presence of a catalyst such as strong base. Thus, in one embodiment of the invention, at least two of the ethylenic double bonds are conjugated, and may exhibit opposite geometric isomerism.

The remaining $R^2$ terminating groups may be hydrogen atoms, hydrocarbyl, or acyl groups not as defined above (i.e. not comprising at least two ethylenic double bonds). Suitable such hydrocarbyl groups (or $R^3$ groups) include lower alkyl groups, e.g. $C_1$ to $C_6$ alkyl groups such as methyl or ethyl groups, acting as chain end caps for one or more of the (poly)alkylene oxide chains, mainly to alter the degree of hydrophilicity of the compounds, and longer chain alkyl or alkenyl groups, e.g. $C_8$ to $C_{22}$ and particularly $C_{16}$ or longer, alkyl or alkenyl groups such as oleyl and stearyl groups or mixed alk(en)yl groups derived from natural fats or oils, which act as secondary hydrophobe(s) in the molecule.

The ratio of hydrocarbyl and acyl, preferably acyl, $R^2$ terminating groups comprising at least two ethylenic double bonds to groups not comprising at least two ethylenic double bonds is suitably in the range from 0.3 to 10:1, preferably 0.7 to 6:1, more preferably 1 to 4:1, particularly 1.2 to 2:1, and especially 1.5 to 1.7:1.

The alkylene oxide groups AO are typically groups of the formula: —(C$_r$H$_{2r}$O)— where r is 2, 3 or 4, preferably 2 or 3, i.e. an ethyleneoxy (—C$_2$H$_4$O—) or propyleneoxy (—C$_3$H$_6$O—) group, and it may represent different groups along the alkylene oxide chain. Generally, it is desirable that the chain is a homopolymeric ethylene oxide chain. However, the chain may be a homopolymer chain of propylene glycol residues or a block or random copolymer chain containing both ethylene glycol and propylene glycol residues. Usually, where co-polymeric chains of ethylene and propylene oxide units are used the molar proportion of ethylene oxide units used will be at least 50% and more usually at least 70%.

The number of alkylene oxide residues in the (poly)alkylene oxide chains, i.e. the value of the each parameter n, will preferably be in the range from 2 to 50, more preferably 3 to 20, and particularly 5 to 10. The total of the indices n (i.e. n×m) is preferably in the range from 10 to 300, more preferably 20 to 100, particularly 25 to 70, and especially 30 to 50. The value of the index n is an average value, which includes statistical variation in the chain length.

Where the number of acyl residues in the molecule is significantly less than m, the distribution of such groups may depend on the nature of the core group and on the extent and effect of the alkoxylation of the core group. Thus, where the core group is derived from pentaerythritol, alkoxylation of the core residue may be evenly distributed over the four available sites from which an active hydrogen can be removed and on esterification of the terminal hydroxyl functions the distribution of acyl groups will be close to the expected random distribution. However, where the core group is derived from compounds, such as sorbitol, where the active hydrogen atoms are not equivalent, alkoxylation will typically give unequal chain lengths for the polyalkyleneoxy chains. This may result in some chains being so short that the other (longer) chains exert significant steric effects making esterification at the "short chain" terminal hydroxyl groups relatively difficult. Esterification then will generally preferentially take place at the "long chain" terminal hydroxyl groups.

The compounds of formula (1) of the invention suitably have an iodine value, measured as described herein, of greater than 40, preferably in the range from 45 to 75, more preferably 50 to 65, particularly 52 to 60, and especially 54 to 56 g/100 g.

The compounds of the invention can be made by firstly alkoxylating $R^1$ core groups containing m active hydrogen atoms, by techniques well known in the art, for example by reacting with the required amounts of alkylene oxide, for example ethylene oxide and/or propylene oxide. Suitable materials are commercially available, for example sorbitol 30 ethoxylate (Atlas G-2330 (trade mark, ex Uniqema)), sorbitol 40 ethoxylate (Atlas G-2004 (trade mark, ex Uniqema)), sorbitol 50 ethoxylate (Atlas G-2005 (trade mark, ex Uniqema)), and trimethylolpropane 40 ethoxylate 10 propoxylate (Emkarox VG-305W (trade mark, ex Uniqema)).

The second stage of the process preferably comprises reacting the aforementioned alkoxylated species with a fatty acid or derivative thereof comprising at least two ethylenic double bonds. The direct reaction between the fatty acid and the alkoxylated precursor can be carried out, with or without catalysts, by heating preferably to a temperature of greater than 100° C., more preferably in the range from 200 to 250° C. Synthesis using reactive derivatives will usually be possible under milder conditions, for example using lower fatty acid esters, fatty acid chlorides and/or their respective anhydrides. Purification of the reaction product does not usually appear to be necessary, but can be carried out if desired.

The fatty acid or derivative thereof suitably has an iodine value, measured as described herein, in the range from 100 to 250, preferably 110 to 200, more preferably 115 to 150, particularly 120 to 140, and especially 125 to 135 g/100 g.

Typically, when fatty acids derived from natural sources are used, the material containing at least two ethylenic double bonds will be available in mixture with other similar compounds having different levels of unsaturation. Mixtures of the at least doubly unsaturated fatty acids with singly unsaturated residues and with proportions of saturated residues can be used. Preferably the fatty acid mixture comprises fatty acids comprising at least two ethylenic double bonds at a concentration of at least 15' mole %, more preferably at least 30 mole %, particularly in the range from 40 to 75 mole %, and especially 55 to 65 mole %. Fatty acids having higher levels of at least double unsaturated residues may provide additional benefits but are significantly more expensive.

The present invention is also directed to the use of the surfactants described herein to form an aqueous emulsion or dispersion of polymeric particles. The polymer dispersion is preferably prepared by condensation polymerisation, and more preferably alkyd resins are employed. In an alternative embodiment, the polymer dispersion is prepared by addition polymerisation of one or more addition polymerisation monomers, preferably ethylenically unsaturated monomers, and more preferably comprising acrylic monomers to produce acrylic homo- and co-polymers.

The preferred alkyd resin used in the present invention is preferably a resin which is the reaction product of (i) one or more polybasic (di- or higher basic) organic acid or anhydride, e.g. phthalic anhydride; or (ii) one or more polyhydric (usually a tri- or higher) alcohol, e.g. glycerol; and one or more monobasic fatty acid or one or more triglyceride, e.g. soya oil, tall oil fatty acids. The molar proportions of these component monomers are chosen to give the desired physical properties and molecular weight distribution of the resulting polyester. The monobasic fatty acid or triglyceride, will generally include unsaturation typically by using vegetable oils as the source of the fatty acid residues, and the presence of unsaturation leads to the air-curing properties of these materials. For this purpose the fatty acids are usually multiply unsaturated. The monobasic acid content of alkyd resins is often expressed as the oil length, and alkyd resins used in this invention will preferably have an oil length in the range from 25 to 100%, more preferably 30 to 80%. In order to provide the desired air drying properties, the proportion of unsaturated, desirably multiple unsaturated, monobasic fatty acid residues will preferably be at least 25%, more preferably at least 50%, and particularly at least 75% by weight of the monobasic fatty acid used in the alkyd resin. Most alkyds are film-forming polymers with a relatively low glass transition temperature, typically below 0° C., which are readily pigmented and usually accept additives to form coatings with a wide range of appearance, performance, and application characteristics. The alkyd resins used in this invention are typical of air-curing types of alkyd resin used in surface coating end use applications. Air drying modified alkyds such as siliconized alkyds, urethane alkyds, vinyl toluenated alkyds and thixotropic alkyds, e.g. modified polyamide resins, can also be used in this invention. Suitable alkyds are widely available and are used extensively in surface coating applications.

We have found that it is desirable to use combinations of non-ionic surfactants of the formula (I) with anionic surfactants such as alkyl ether carboxylates, alkyl aryl sulphonates, phosphate esters, alkyl ether sulfates, hemi or di ester of sulphosuccinates, sulfated or sulphonated oils such as castor oil, or sulfonated tallow, alkyl or alkylene sulfates, or a mixture of at least two such anionic surfactants. These well known classes of anionic surfactant are supplied as either acidic, or include counter ions to make them more nearly neutral. In this invention, neutralised anionic surfactants can be used or neutralising agents can be included in the compositions. Suitable counter ions include those derived from alkali metals, particularly sodium and potassium (suitably provided as hydroxide or carbonate) and, especially for ether carboxylates, amines, especially tertiary amines including hydroxyalkyl amines especially alkanolamines such as triethanolamine (TELA). Neutralisation at the point of use or in situ during emulsification can be carried out using suitable base such as alkali metal hydroxide or carbonate or amines, particularly alkanolamines such as TELA. The amount of neutralising agent used is preferably in the range from 0.5 to 5% by weight of the emulsion, although, in practice, the amount of neutralising agent used will normally be that sufficient to achieve a desired pH level in the product emulsion. Preferably, the pH of the final emulsion is in the range from 3 to 10, more preferably 5 to 9. Where an anionic surfactant is used, the neutralising agent (either in the surfactant or deliberately added) will typically be included in an amount to give a pH in these ranges.

When used, the anionic surfactant is preferably used in proportions of non-ionic surfactant including compound of the formula (I) to anionic surfactant, particularly an alkyl aryl sulphonate, an ether carboxylate or a mixture of these surfactants, in the range 90:10 to 10:90, more preferably 80:20 to 20:80 by weight, and particularly about 75:25 by weight.

The invention accordingly includes an aqueous emulsion of an alkyd resin which includes as an emulsifier a compound of the formula (I) as defined above in combination with an anionic surfactant, particularly an alkyl ether carboxylate, an alkyl aryl sulphonate, a phosphate ester, an alkyl ether sulfate, or a mixture of at least two such anionic surfactants, where the weight ratio of compound(s) of the formula (I) to anionic surfactant is in the range 90:10 to 10:90.

The total amount of emulsifier, including non-ionic surfactant and anionic surfactant, used in emulsions of this invention is preferably in the range from 2 to 20%, more preferably 5 to 15%, and particularly 6 to 10%, by weight based on the resin emulsified. In general lower amounts of emulsifier give emulsions with larger average particle size and usually higher polydispersity, generally implying a longer "tail" of relatively coarse emulsion droplets. Based on emulsions containing 50% of resin these correspond to general amounts of surfactant in the range from 1 to 10%, more preferably 2.5 to 7.5% and particularly 3 to 5% by weight on the total emulsion. The amounts used for emulsions containing other resin proportions will vary accordingly.

The emulsions will preferably contain in the range from 30 to 60%, more preferably 40 to 55%, and particularly about 50% by weight of the emulsified resin.

Typical emulsion compositions by weight are exemplified in the following table:

| Material | Amount (parts by weight) | |
|---|---|---|
| | Preferred | More Preferred |
| Alkyd Resin | 40 to 60 | about 50 |
| Total Surfactant | 0.5 to 7 | 0.6 to 6 |
| Non-Ionic | 0.5 to 5.5 | 2 to 5 |
| Anionic (when used) | 0.5 to 5.5 | 2 to 5 |
| Weight Ratio Non-Ionic:Anionic (when anionic used) | 90:10 to 10:90 | 80:20 to 20:80 |
| Neutralising Agent (1) | pH 3 to 10 | pH 3 to 10 |
| Water | to 100 | |

(1) The amount of neutralising agent (if any) is sufficient to give a pH in the stated range.

The amount of surfactant is expressed as a percentage based on the weight of the resin is preferably in the range from 5 to 15%, more preferably 6 to 10%.

Other materials, e.g. process additives can be added either to the aqueous phase or to the oil phase prior to emulsification in order to facilitate the emulsification process.

Process Additives Include:
- adjunct solvents, e.g. glycols or glycol ethers such as methoxypropanol, preferably present in the range from 1 to 10%, more preferably 3 to 7% by weight of the emulsion, may be included as processing aids.
- antifoam agents or defoamers which when used will preferably be present in the range from 0.01 to 2% by weight of the emulsion;
- neutralising or buffering agents to adjust the pH of the emulsion during or after formation to a suitable level, usually not strongly acidic or alkali, preferably present in the range from 0 to 150%, more preferably 40 to 110% expressed as a percentage of the resin acid value;
- rheology modifiers which when used will preferably be present in the range from 0.5% to 20%, more preferably 0.5 to 10%, and particularly 0.5 to 3%, by weight of the emulsion.
- electrolytes which when used to control the inversion mechanism will preferably be present in the range from $1\ mmol \cdot l^{-1}$ to $100\ mmol \cdot l^{-1}$ of emulsion.

The emulsions of the invention can be prepared either by the direct or, and preferably, by the inversion methods. Inverse emulsification can, in particular be done by forming a mixture of the resin and surfactant, including surfactant of the formula (I), adding water to form a water-in-oil(resin) emulsion, continuing water addition until the emulsion inverts to form an oil(resin)-in-water emulsion and, if necessary, e.g. to prevent re-inversion of the emulsion and/or to adjust the solids content of the emulsion, adding further water to adjust the disperse phase content of the emulsion to that desired. This technique is known in the art as the Emulsion Inversion Point (EIP) method.

The invention accordingly includes a method of making an aqueous emulsion of an alkyd resin which comprises forming a mixture of the resin and surfactant, including at least one surfactant of the formula (I), including water in the mixture to form a water-in-oil(resin) emulsion, and subsequently adding water to the water-in-oil emulsion at least until the emulsion inverts to form an oil(resin)-in-water emulsion and, optionally, adding further water to adjust the disperse phase content of the emulsion to that desired.

The temperature at which the emulsification is carried out very much depends upon the properties of the resin, more particularly the viscosity. For resins which are solid or viscous liquids at ambient temperature, elevated temperatures may be needed in the emulsification. Even for resins which are liquid at ambient temperature it may be advantageous to use higher processing temperatures, e.g. to obtain finer emulsions, and for alkyd resins, a temperature preferably in the range from 30 to 100° C., more preferably 40 to 90° C. and particularly about 80° C. can be used.

The alkyd emulsions of the invention can be used for the preparation of waterborne paints or coatings by mixing with at least one separately prepared pigment dispersion. This procedure often referred to as "letdown" is carried out under gentle agitation as is well known in the art. The success of the letdown step depends on achieving an intimate intermingling of these two disparate particle systems to yield a stable and uniform overall particle suspension (the alkyd-based paint). The practical performance of such paint formulations will usually be improved by including other additives such as driers, rheology modifiers, wetting and compatibility agents, flow and levelling agents etc. which will typically be incorporated at this stage. Typical applications of formulations include wood coatings, high gloss architectural paints etc.

For use in surface coating applications, the formulations will usually include one or more catalysts or driers. Driers are typically oil/resin soluble metal salts such as naphthenates. Driers are preferably incorporated at levels in the range from 1 to 10% by weight based on the resin. Co-driers can also be included such as the commercial material Nuac NOPN. Such materials are also described as loss of dryness inhibitors as they can counter possible inhibition of driers by the presence of for example, anionic surfactants or emulsifiers. Their inclusion can give faster or more complete hardening of the resin film in a coating thus enhancing performance. Co-driers are preferably incorporated at levels in the range from 1 to 10% by weight based on the resin.

EXAMPLES

In this specification the following test methods have been used:

Acid Value

The acid value was determined by using ASTM D1980-87 (Standard test method for acid value of fatty acids and polymerised fatty acids).

Hydroxyl Value

The hydroxyl value was measured by using ASTM D1957-86 (Standard test method for hydroxyl value of fatty oils and acids).

Iodine Value

The iodine value was determined by using ASTM D 1959-85 (Standard test method for iodine value of drying oils and fatty acids).

Emulsion Production

Alkyd resin emulsions were made by the inverse emulsification method. Emulsions were made in 100 ml batches. The experiments were carried out using a standard rotary mixer with Cowles blade operating at a rotational speed of 1500 rpm. The blade diameter was 4 cm, and the cylindrical vessel had an inner diameter of 5 cm (i.e. 5 mm gap on either side of the blade). The liquid (liquefied) alkyd resin was placed in the emulsification vessel, the surfactants were melted (if necessary) and added to the resin. The mixture was stirred thoroughly whilst raising the temperature to 80° C. About a third of the water phase was initially added. A water-in-oil emulsion was formed having a high viscosity (>50,000 centipoise). After continuing stirring for about 15 minutes, the temperature was lowered to 60° C., and the remaining water added. During this time, the viscosity increased further, followed by a sudden drop leading to the formation of an oil-in-water emulsion which was the desired final state. Subsequently, the temperature was allowed to return to ambient with continuous stirring.

Viscosity

The viscosity of the alkyd resin emulsion was measured, after overnight standing, on a Brookfield RV viscometer using spindle 4 at 20 rpm and a temperature of 30° C.

Particle Size Analysis

Emulsion particle size was measured using a Horiba LA500 laser diffraction particle size analyser. The standard output of this instrument is the median diameter, the value corresponding to cumulative 50% population on either side. Measurements were usually made 24 hours after preparation, in order to prevent interference from foaming. Repeat measurements were made after storage for certain time periods.

Gloss

Gloss was measured with a 20° angle of reflectance using a Sheen 160 Tri-microgloss instrument and is expressed as a percentage. Gloss retention was measured as the gloss after 1 month of film exposure to daylight. Gloss was also measured on paint films made using standard paint formulations containing rutile titanium dioxide alone, or rutile titanium dioxide in combination with other extenders such as calcined china clay and calcium carbonate.

Film Hardness

The film hardness measurements were made using a Sheen Scratch Test Apparatus model REF 705. Metal panels were used as substrate, and the coating applied using a bar coater. Care was taken to prepare the surface of the metal panels such that they are free from rust and other oily residues. The wet thickness of the films was 100 microns. The panels were subsequently kept in an oven with air circulation at a temperature of 35° C. Hardness measurements were made after 4, 7, 14 and 28 days of drying.

The invention is illustrated by the following non-limiting examples.

EXAMPLES

Example 1

310 g of Prifac 8960 (trade mark, ex Uniqema (fatty acid mixture containing linoleic acid)) was melted at 30° C. under nitrogen. 403 g of Atlas G-2004 (trade mark, ex Uniqema (sorbitol 40 ethoxylate)) was placed in a one liter, flat flanged, glass reaction vessel. An overhead electric stirrer (200 rpm) and nitrogen sparge (1-2 L/hr/kg) were applied. The Prifac 8960 was added to the reaction vessel, stirred at 500 rpm, and heat applied, by use of an Electromantle, to 245° C., over two hours, under nitrogen sparge of 3 L/hr/kg. Acidity and, subsequently, hydroxyl value was measured at regular intervals. The reaction was deemed complete when the acid value was less than 6, and the hydroxyl value in the range from 40 to 55 (reaction time approx. 3-5 hours). The resultant reaction product was cooled to 80° C., filtered through Dicalite (diatomaceous earth) filter aid, and discharged. The product was used without further work up or purification.

Example 2

This is a comparative example, not according to the present invention.

50 g of alkyd resin (long oil resin based on penta and linseed with oil length 65%) was placed in a jacketed cylindrical container. 2.7 g of Atsurf G-5000 (trade mark, ex Uniqema (polyalkylene glycol ether)) and 1.8 g of Disponil FES32IS (lauryl alcohol 5 EO sulphate sodium salt, ex Henkel) were added to the resin, and the mixture stirred gently whilst circulating hot water through the jacketed vessel. After reaching a temperature of 80° C., 15 ml of water (pre-heated to 80° C.) was slowly added at a stirrer speed of 1500 rpm. A thick water-in-oil type emulsion was formed, as is evident from the fact that this was not dispersible in water. After continuing the stirring for a further 15 minutes, the contents were cooled down to 60° C. With continued stirring at 1500 rpm, a further quantity of 30.5 ml water was added during which time the emulsion underwent inversion, and the viscosity reduced steeply (with noticeable vortex formation). The mixing was continued for a further period of 3 to 4 minutes to ensure complete homogeneity. At this stage, the emulsion was readily dispersible in water. The contents were cooled to ambient temperature, and the water loss due to evaporation was compensated for by adding more water. The emulsion samples were stored in stoppered glass bottles. The emulsion droplet size was 0.40 micron after 24 hours, and 0.38 micron after 6 months. The viscosity of the emulsion was 200 centipoise after both 24 hours and 6 months.

1% by weight of a proprietary drying system was added to the emulsion produced above, and a film of 100 microns wet film thickness was coated on to metal panels using a bar coater. Film hardness development was measured using the hardness tester as described above, and the results were as follows;

(i) After 4 days drying: 975 g
(ii) After 7 days drying: 1100 g
(iii) After 14 days drying: 1200 g
(iv) After 28 days drying: 1275 g A typical commercial paint formulation was made incorporating 8 parts of the above emulsion to 2 parts of a mill base having following composition;

| | Weight % |
|---|---|
| Dispersants | 12.42 |
| Biocide | 0.57 |
| Levelling agent-1 | 2.90 |
| Levelling agent-2 | 2.90 |
| Defoamer | 0.38 |
| Rutile $TiO_2$ | 61.30 |
| Thickener | 0.38 |
| Water | 19.14 |
| Total | 100 |

Again water borne drying agents were incorporated at 1% by weight of the above paint formulation, and films were prepared on glass panels using a sheen applicator keeping the panels at 60° C. for 2 hours. The gloss value obtained was 62%.

Example 3

The procedure of Example 2 was repeated except that 3 g of the product of Example 1 was used (instead of Atsurf G5000) together with 2 g of Disponil FES32IS. The emulsion droplet size was 0.43 micron after 24 hours, and 0.40 micron after 8 months. The viscosity of the emulsion was 200 centipoise both after 24 hours and 8 months.

Film hardness development was evaluated as described in Example 2 and the film hardness results were as follows;
(i) After 4 days drying: 1225 g
(ii) After 7 days drying: 1300 g
(iii) After 14 days drying: 1350 g
(iv) After 28 days drying: 1450 g Gloss measurements were made using an identical paint formulation as described in Example 2 and the gloss value obtained was 60%.

The above improvement in film hardness properties and maintenance of gloss value illustrate the improved properties of a surfactant and alkyd resin according to the present invention.

The invention claimed is:

1. A method of forming an aqueous alkyd resin emulsion, comprising:
   i) combining the alkyd resin and a mixture of alkyd resin emulsifying compounds represented by formula (I):

$$R^1\text{-}[(AO)_n\text{-}R^2]_m \quad (I)$$

wherein:
   $R^1$ independently represents the residue of, or derived from, a sugar having a linear $C_4$ to $C_7$ chain and at least m active hydrogen atoms in hydroxyl groups;
   AO independently represents an alkylene oxide residue;
   each n is independently from 5 to 50;
   m is from 3 to 6;
   total n is from 30 to 300; and
   $R^2$ independently represents a hydrogen atom, or an acyl group —(CO)$R^3$;
   $R^3$ independently represents a $C_{15}$ to $C_{19}$ hydrocarbyl group;
   wherein:
   a) on average each compound comprises from 2 to 6 acyl groups; and
   b) on average at least 1.2 of the $R^2$ groups per compound comprises a $C_{15}$ to $C_{19}$ hydrocarbyl group comprising at least two ethylenic double bonds;
   ii) including water to form a water-in-oil (resin) emulsion.

2. The method of claim 1, wherein the method further comprises subsequently adding water to the water-in-oil (resin) emulsion at least until the emulsion inverts to form an oil(resin)-in-water emulsion.

3. The method of claim 2, wherein the method further comprises adding further water to adjust the disperse phase content of the emulsion to that desired.

4. The method of claim 1, wherein $R^2$ represents an acyl group.

5. The method of claim 1, wherein on average each compound comprises from 4 to 6 acyl groups.

6. The method of claim 1, wherein on average each compound comprises from 3 to 4 acyl groups.

7. The method of claim 1, wherein the $C_{15}$ to $C_{19}$ hydrocarbyl group comprising at least two ethylenic double bonds is derived from linoleic acid.

8. The method of claim 1, wherein at least one of the ethylenic double bonds is reactive during curing of an alkyd resin film formed from the formed emulsion.

9. The method of claim 1, wherein the average number of double bonds present in the $C_{15}$ to $C_{19}$ hydrocarbyl group comprising at least two double bonds is in the range from 2.0 to 2.4.

10. The method of claim 1, wherein the ratio of $R^2$ groups comprising $C_{15}$ to $C_{19}$ hydrocarbyl groups comprising at least two ethylenic double bonds to $C_{15}$ to $C_{19}$ hydrocarbyl groups not comprising at least two ethylenic double bonds is on average in the range from 0.7:1 to 6:1.

11. An aqueous emulsion or dispersion, comprising: i) polymeric particles comprising an alkyd resin; and ii) a mixture of alkyd resin emulsifying compounds represented by formula (I):

$$R^1\text{-}[(AO)_n\text{-}R^2]_m \quad (I)$$

wherein:
$R^1$ independently represents the residue of, or derived from, a sugar having a linear $C_4$ to $C_7$ chain and at least m active hydrogen atoms in hydroxyl groups;
AO independently represents an alkylene oxide residue;
each n is independently from 5 to 50; m is from 3 to 6; total n is from 30 to 300; and $R^2$ independently represents a hydrogen atom, or an acyl group —(CO)$R^3$; $R^3$ independently represents a $C_{15}$ to $C_{19}$ hydrocarbyl group; wherein a) on average each compound comprises from 2 to 6 acyl groups; and b) on average at least 1.2 of the $R^2$ groups per compound comprises a $C_{15}$ to $C_{19}$ hydrocarbyl group comprising at least two ethylenic double bonds.

12. The aqueous emulsion or dispersion of claim 11, wherein the aqueous emulsion or dispersion further comprises an anionic surfactant comprising an alkyl ether carboxylate, an alkyl aryl sulphonate, a phosphate ester, an alkyl ether sulfate, or a mixture of at least two such anionic surfactants.

13. An alkyd resin film, comprising the aqueous emulsion or dispersion of claim 11.

14. The alkyd resin film of claim 13, wherein at least one of the ethylenic double bonds is reactive during curing of the alkyd resin film.

15. A mixture of alkyd resin emulsifying compounds represented by formula (I):

$$R^1\text{-}[(AO)_n\text{-}R^2]_m \quad (I)$$

wherein:
$R^1$ independently represents the residue of, or derived from, a sugar having a linear $C_4$ to $C_7$ chain and at least m active hydrogen atoms in hydroxyl groups;

AO independently represents an alkylene oxide residue;
each n is independently from 5 to 50;
m is from 3 to 6;
total n is from 30 to 300; and
$R^2$ independently represents a hydrogen atom, or an acyl group —$(CO)R^3$;
$R^3$ independently represents a $C_{15}$ to $C_{19}$ hydrocarbyl group;

wherein:
- a) on average each compound comprises from 2 to 6 acyl groups; and
- b) on average at least 1.2 of the $R^2$ groups per compound comprises a $C_{15}$ to $C_{19}$ hydrocarbyl group comprising at least two ethylenic double bonds; and
- c) at least one of the ethylenic double bonds is reactive during curing of an alkyd resin.

16. The mixture of compounds of claim 15, wherein $R^1$ independently represents the residue of sorbitol.

17. The mixture of compounds of claim 15, wherein on average each compound comprises from 3 to 4 acyl groups.

18. The mixture of compounds of claim 15, wherein the $C_{15}$ to $C_{19}$ hydrocarbyl group comprising at least two ethylenic double bonds is derived from linoleic acid.

19. The mixture of compounds of claim 15, wherein the at least two ethylenic double bonds are conjugated.

20. The mixture of compounds of claim 15, wherein the average number of double bonds present in the $C_{15}$ to $C_{19}$ hydrocarbyl group comprising at least two double bonds is in the range from 2.0 to 2.4.

21. The mixture of compounds of claim 15, wherein the mixture of alkyd resin emulsifying compounds are formed by reacting a fatty acid or derivative thereof having an iodine value in the range from 100 to 250 g/100 g with an alkoxylated $R^1$ group.

22. The mixture of compounds of claim 15, wherein the mixture of alkyd resin emulsifying compounds has an iodine value in the range from 45 to 75 g/100 g.

23. A paint, comprising:
- i) an aqueous or mixed aqueous organic continuous phase;
- ii) an alkyd resin emulsion discontinuous phase;
- iii) the mixture of alkyd resin emulsifying compounds of claim 15; and
- iv) at least one pigment.

* * * * *